US010598476B2

(12) United States Patent
Witkos et al.

(10) Patent No.: US 10,598,476 B2
(45) Date of Patent: Mar. 24, 2020

(54) APPARATUS AND METHOD OF CONTROLLING CMM USING ENVIRONMENTAL INFORMATION OR CMM INFORMATION

(71) Applicant: Hexagon Metrology, Inc., North Kingstown, RI (US)

(72) Inventors: Paul Witkos, Middletown, RI (US); Bruce Pease, Wakefield, RI (US); Zachary Cobb, Newport, RI (US); Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 611 days.

(21) Appl. No.: 15/153,250

(22) Filed: May 12, 2016

(65) Prior Publication Data
US 2016/0334201 A1 Nov. 17, 2016

Related U.S. Application Data

(60) Provisional application No. 62/160,216, filed on May 12, 2015.

(51) Int. Cl.
*G01B 5/008* (2006.01)
*G01B 21/04* (2006.01)
(Continued)

(52) U.S. Cl.
CPC .......... *G01B 5/008* (2013.01); *G01B 5/0014* (2013.01); *G01B 21/045* (2013.01);
(Continued)

(58) Field of Classification Search
CPC .. G01B 21/045; G01B 21/047; G01B 11/005; G01B 5/008; G01B 11/007; G01B 21/04;
(Continued)

(56) References Cited

U.S. PATENT DOCUMENTS 3,633,011 A * 1/1972 Bederman ............ G05B 19/408
318/574
4,276,698 A 7/1981 Dore et al.
(Continued)

FOREIGN PATENT DOCUMENTS

CN 202133387 U 2/2012
CN 204027541 U 12/2014
(Continued)

OTHER PUBLICATIONS

International Searching Authority, International Search Report and Written Opinion pertaining to International Application No. PCT/US2016/032137, 14 pages, dated Aug. 4, 2016.
(Continued)

*Primary Examiner* — Yaritza Guadalupe-McCall
(74) *Attorney, Agent, or Firm* — Nutter McClennen & Fish LLP (57) ABSTRACT

A method of measuring an object uses a coordinate measuring machine, which is positioned within an environment (e.g., a clean room). The method receives sensing information relating to the coordinate measuring machine, the environment, or both the coordinate measuring machine and the environment. Next, the method controls the coordinate measuring machine to perform, based on the sensing information, a specified mechanical action.

20 Claims, 6 Drawing Sheets

(51) Int. Cl.
*G05B 19/401* (2006.01)
*G01B 5/00* (2006.01)
*G05B 19/404* (2006.01)

(52) U.S. Cl.
CPC .......... *G05B 19/401* (2013.01); *G05B 19/404* (2013.01); *G05B 2219/37193* (2013.01)

(58) Field of Classification Search
CPC .............. G01B 5/012; G01B 5/0014; G05B 2219/37193; G05B 19/401; G05B 19/404
USPC ........................................................ 33/503
See application file for complete search history.

(56) References Cited

U.S. PATENT DOCUMENTS

| | | | |
|---|---|---|---|
| 4,628,441 A | 12/1986 | Johnstone et al. | |
| 4,651,426 A | 3/1987 | Band et al. | |
| 4,713,772 A * | 12/1987 | Carlson .............. | G01N 33/1893 422/62 |
| 4,766,550 A * | 8/1988 | Byers .................... | G01N 30/24 422/62 |
| 4,825,394 A * | 4/1989 | Beamish ................ | B25J 9/1697 356/147 |
| 4,901,218 A * | 2/1990 | Cornwell ........... | G05B 19/4185 340/3.1 |
| 4,928,396 A | 5/1990 | Raleigh | |
| 4,958,438 A | 9/1990 | Hemmelgarn | |
| 4,964,221 A | 10/1990 | Breyer et al. | |
| 5,134,782 A | 8/1992 | Breyer et al. | |
| 5,198,990 A * | 3/1993 | Farzan ................... | G01B 21/04 700/195 |
| 5,251,156 A | 10/1993 | Heier et al. | |
| 5,471,406 A | 11/1995 | Breyer et al. | |
| 5,778,549 A | 7/1998 | Campanile | |
| 5,815,400 A * | 9/1998 | Hirai .................... | G05B 19/401 700/173 |
| 5,867,916 A | 2/1999 | Matzkovits | |
| 6,333,696 B1* | 12/2001 | Matsumiya ............ | B25J 19/063 340/679 |
| 6,449,581 B1 | 9/2002 | Ruck | |
| 6,486,963 B1 | 11/2002 | Holec | |
| 6,633,256 B2 | 10/2003 | Zhdanov et al. | |
| 6,640,607 B2* | 11/2003 | Abbe ..................... | B25J 9/1692 73/1.01 |
| 6,919,658 B2 | 7/2005 | Kaczynski | |
| 7,194,387 B1* | 3/2007 | Filatov ................. | G01B 21/045 700/182 |
| 7,319,909 B2 | 1/2008 | Ishikawa | |
| 7,576,847 B2 | 8/2009 | Bridges | |
| 7,779,553 B2 | 8/2010 | Jordil et al. | |
| 8,001,697 B2 | 8/2011 | Danielson et al. | |
| 8,001,859 B2 | 8/2011 | McMurtry et al. | |
| 8,006,398 B2 | 8/2011 | McFarland et al. | |
| 8,056,434 B2 | 11/2011 | Ehrenberg | |
| 8,103,153 B2 | 1/2012 | Uhl et al. | |
| 8,191,274 B2 | 6/2012 | Eaton | |
| 8,229,694 B2 | 7/2012 | Nakagawa et al. | |
| 8,352,212 B2 | 1/2013 | Fetter et al. | |
| 8,537,372 B2 | 9/2013 | Pettersson et al. | |
| 8,605,983 B2* | 12/2013 | Weston ................ | G01B 11/007 348/48 |
| 8,638,984 B2 | 1/2014 | Roithmeier | |
| 8,820,623 B2 | 9/2014 | Mayer et al. | |
| 9,046,360 B2 | 6/2015 | Atwell et al. | |
| 9,057,599 B2 | 6/2015 | Mariller et al. | |
| 9,074,620 B2 | 7/2015 | Duportal et al. | |
| 9,075,025 B2 | 7/2015 | Bridges | |
| 9,086,262 B2 | 7/2015 | Pettersson et al. | |
| 9,310,178 B2* | 4/2016 | Salvade ............... | G01B 5/008 |
| 9,329,030 B2* | 5/2016 | Weston ................ | G01B 11/007 |
| 9,739,606 B2* | 8/2017 | Jonas ................... | G01B 5/008 |
| 9,759,540 B2* | 9/2017 | Ferrari ................. | G01B 5/012 |
| 2002/0148275 A1* | 10/2002 | Abbe ..................... | B25J 9/1692 73/1.01 |
| 2003/0125901 A1* | 7/2003 | Steffey ................. | G01B 11/005 702/155 |
| 2005/0256611 A1 | 11/2005 | Pretlove et al. | |
| 2005/0288889 A1* | 12/2005 | Wilson .................. | G01B 21/04 702/155 |
| 2006/0047457 A1* | 3/2006 | Agapiou ................ | G01B 21/04 702/94 |
| 2006/0266100 A1 | 11/2006 | McMurtry et al. | |
| 2008/0163054 A1 | 7/2008 | Pieper et al. | |
| 2009/0055024 A1 | 2/2009 | Kay | |
| 2010/0036393 A1 | 2/2010 | Unsworth | |
| 2010/0135534 A1* | 6/2010 | Weston ................ | G01B 11/007 382/106 |
| 2012/0060384 A1 | 3/2012 | Grözinger et al. | |
| 2012/0154576 A1* | 6/2012 | Weston ................ | G01B 11/007 348/136 |
| 2012/0246953 A1 | 10/2012 | Engel | |
| 2014/0157861 A1* | 6/2014 | Jonas ................... | G01B 5/008 73/1.79 |
| 2014/0211191 A1 | 7/2014 | Jensen et al. | |
| 2014/0222373 A1 | 8/2014 | Sprenger | |
| 2014/0249772 A1 | 9/2014 | Sprenger | |
| 2014/0368832 A1* | 12/2014 | Salvade ............... | G01B 5/008 356/497 |
| 2015/0025845 A1 | 1/2015 | Mansfield | |
| 2015/0049186 A1 | 2/2015 | Pettersson et al. | |
| 2015/0051862 A1* | 2/2015 | Jonas ................... | G01B 21/045 702/97 |
| 2015/0205277 A1 | 7/2015 | Igasaki | |
| 2015/0219452 A1 | 8/2015 | Bridges et al. | |
| 2015/0226539 A1* | 8/2015 | Roeth ................. | G01B 11/005 356/614 |
| 2015/0253125 A1 | 9/2015 | Pettersson | |
| 2015/0260499 A1 | 9/2015 | Raiteri | |
| 2015/0362305 A1* | 12/2015 | Ferrari ................. | G01N 29/225 33/503 |
| 2016/0146589 A1* | 5/2016 | Jonas ................... | G01B 21/045 33/503 |
| 2016/0334201 A1* | 11/2016 | Witkos ................ | G01B 21/045 |
| 2017/0363403 A1* | 12/2017 | Jonas ................... | G01B 5/0014 |
| 2018/0058840 A1* | 3/2018 | Lamendola .......... | G01B 11/005 |
| 2018/0073850 A1* | 3/2018 | Ferrari ................. | G01B 5/012 |
| 2018/0203119 A1* | 7/2018 | Kern .................... | G01B 21/042 |

FOREIGN PATENT DOCUMENTS

| | | |
|---|---|---|
| DE | 19930087 A1 | 1/2001 |
| DE | 10 2010 014 423 A1 | 6/2011 |
| EP | 2 788 714 B1 | 7/2015 |
| JP | 03105398 B2 | 10/2000 |
| JP | 2004-093190 | 3/2004 |
| JP | 4047096 B2 | 2/2008 |
| JP | 04280456 B2 | 6/2009 |
| JP | 2009-192401 A | 8/2009 |
| JP | 5686578 B2 | 3/2015 |
| WO | WO 2009/127526 A1 | 10/2009 |
| WO | WO 2009/129916 A1 | 10/2009 |
| WO | WO 2011/090894 A1 | 7/2011 |
| WO | WO 2011/131479 A1 | 10/2011 |
| WO | WO 2014/128299 A1 | 8/2014 |

OTHER PUBLICATIONS

Aberlink, "CMM Temperature Compensation," 2 pages, retrieved Oct. 8, 2015 from https://www.aberlink.com/products/cmm-accessories/temperature-compensation/.

Aberlink, "CMM First Line Maintenance," 5 pages; Publication date unknown.

Breuer, "Entwicklung einer prototypischen Gestenerkennung in Echtzeit unter Verwendung einer IR-Tiefenkamera," Institut für Computervisualistik, 70 pages, Dec. 2005.

Engineering 360, "Coordinate Measuring Machines (CMM) Information," 3 pages, retrieved Oct. 8, 2015 from http://www.globalspec.com/learnmore/manufacturing_process_equpment/inspection_tools.

(56) References Cited

OTHER PUBLICATIONS

Faro, "Measuring arm FAROArm—Overview—Portable Measuring Solutions from FARO," 2 pages, retrieved Oct. 8, 2015, from http://www.faro.com/en-us/products/metrology/measuring-arm-faroarm/overview.
Faro, "FARO Laser Tracker—Overview—Laser Tracking Solutions," 2 pages, retrieved Oct. 8, 2015 from http://www.faro.com/en-us/products/metrology/faro-laser-tracker/overview.
Foix et al., "Exploitation of Time-of-Flight (ToF) Cameras," IRI Technical Report, IRI, 22 pages, 2007.
Foix et al., "Lock-in Time-of-Flight (ToF) Cameras: A Survey," OEEE Sensors Journal, vol. 11, No. 3, pp. 1-11, Mar. 2011.
Hexagon, "Whitepaper: Modern CMM Design Concepts," 5 pages, retrieved Oct. 8, 2015 from http://www.hexagonmetrology.us/applications/2011-09-16-14-41-07/299-whitepaper-mod.
Iba, et al., "An Architecture for Gesture-Based Control of Mobil Robots," Carnegie Mellon University, Research Showcase at CMU, 7 pages, 1999.
Kilic et al., "Analysis and estimation of motion transmission errors of a timing belt drive," Turk J Elec Eng & Comp Sci, vol. 18, No. 5, 2010.
Morey, Bruce, "Measuring with Light and Sight," Manufacturing Engineering, 4 pages, May 1, 2008.
Sato et al., "A Human-Robot Interface Using an Interactive Hand Pointer that Projects a Mark in the Real Work Space," Robotics and Automation, 2000. Proceedings. ICRA '00. IEEE International Conference, pp. 589-595, 2000.
Subramanian et al., "Integrating a Vision System with a Coordinate Measuring Machine to Automate the Datum Alignment Process," Proceedings of ASME2005, International Design Engineering Technical Conferences & Computers and Information in Engineering, pp. 1-7, Sep. 24-28, 2005.

* cited by examiner

APPARATUS AND METHOD OF
CONTROLLING CMM USING
ENVIRONMENTAL INFORMATION OR
CMM INFORMATION

CROSS-REFERENCE TO RELATED
APPLICATIONS

This patent application claims priority from provisional U.S. patent application No. 62/160,216, filed May 12, 2015, entitled, "Apparatus and Method of Controlling CMM Using Environmental Information or CMM Information," and naming Paul Witkos, Bruce Pease, Zack Cobb and Milan Kocic inventors [practitioner's file 3740A/1034], the disclosure of which is incorporated herein, in its entirety, by reference.

FIELD OF THE INVENTION

The invention generally relates to coordinate measuring machines and, more particularly, the invention relates to managing coordinate measuring machines in response to fluctuations in environmental and other conditions.

BACKGROUND OF THE INVENTION

Coordinate measuring machines (CMMs) are the gold standard for accurately measuring a wide variety of different types of work pieces/objects. For example, CMMs can measure critical dimensions of aircraft engine components, surgical tools, and gun barrels. Precise and accurate measurements help ensure that their underlying systems, such as an aircraft in the case of aircraft components, operate as specified.

Some objects are measured to a fine precision, such as on the micron level. Environmental conditions, however, can significantly impact the ultimate accuracy of such precise measurements. For example, a CMM may measure a metal object having a high coefficient of thermal expansion within a thermally changing environment (e.g., the temperature is increasing or decreasing). If the CMM measures to the nearest micron or tens of microns, even a small increase or decrease in size caused by thermal variations can produce erroneous measurements.

SUMMARY OF VARIOUS EMBODIMENTS

In accordance with one embodiment, a method of measuring an object using a coordinate measuring machine, the coordinate measuring machine being in an environment, includes receiving sensing information relating to the environment; and controlling the coordinate measuring machine to perform, based on the sensing information, a specified mechanical action.

In some embodiments, the sensing information includes information relating to at least one of temperature, vibration, humidity, pressure, light, and composition of fluid in vicinity of coordinate measuring machine. To that end, in various embodiments, the coordinate measuring machine includes at least one of a temperature sensor, inertial sensor, humidity sensor, pressure sensor, light sensor, and air sensor.

In some embodiments, controlling the coordinate measuring machine includes measuring the object using the coordinate measuring machine, while in some embodiments controlling the coordinate measuring machine to measure the object a second time.

In some embodiments, controlling the coordinate measuring machine includes causing an alert to be generated, for example, via an interconnected computer device configured to generate the alert. In various embodiments, the alert includes at least one of an alarm and a message transmitted to a remote computer.

In some embodiments, the object has a size tolerance and the coordinate measuring machine has a precision, and the method further includes controlling the coordinate measuring machine as a function of the size tolerance of the object, the received sensing information, and the precision of the coordinate measuring machine. For example in some embodiments the received sensing information includes a temperature of the object at the time of execution of the specified mechanical action, and/or includes a temperature of air in the vicinity of the object at the time of execution of the specified mechanical action.

Some embodiments also measure the object using the coordinate measuring machine to produce a measurement; determine an error amount based on the received sensing information; and applying the error amount to the measurement to determine an adjusted measurement.

In another embodiment, a coordinate measuring machine for measuring an object in an environment, the coordinate measuring machine includes a base configured to support the object; a measuring apparatus configured to measure the object; at least one sensor configured to detect sensing information relating to at least one of the environment, the coordinate measuring machine, and the object; and a controller operatively coupled with the at least one sensor, the controller configured to control the coordinate measuring machine to perform, based on the sensing information, a specified mechanical action.

In some embodiments, the controller is configured to control the coordinate measuring machine to measure the object, and/or to measure the object a second time.

In some embodiments, the at least one sensor includes at least one of a temperature sensor, inertial sensor, humidity sensor, pressure sensor, light sensor, and air sensor.

In some embodiments, the at least one sensor configured to detect a temperature of the object, the object has a size tolerance, and the coordinate measuring machine having a precision. In such embodiments, the controller being configured to control the coordinate measuring machine as a function of the size tolerance of the object, the temperature of the object, and the precision of the coordinate measuring machine.

In another embodiment, a method of measuring an object using a coordinate measuring machine, the coordinate measuring machine being in an environment, includes measuring the object using the coordinate measuring machine to produce measured data; receiving sensing information relating to at least one of the object, the coordinate measuring machine, and the environment; selectively producing an alarm as a function of the sensing information and the measured data; and producing an action in response to the alarm if the alarm is produced. In some embodiments, the alarm includes a message forwarded to a remote computer device.

In some embodiments, the sensing information includes the amplitude of vibration of the coordinate measuring machine during the step of measuring the object.

In some embodiments, wherein the object has a size tolerance and the coordinate measuring machine has a precision, the step of producing an alarm is a function of at least one of the size tolerance and the precision.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a coordinate measuring machine has logic that responds to conditions relating to its surrounding environment, the object it is measuring, or the coordinate measuring machine itself. As a few examples, the conditions may include temperature, vibration, humidity, movement of a portion of the coordinate measuring machine, pressure, light, and/or composition of the air in vicinity of coordinate measuring machine (e.g., oxygen content). Details of illustrative embodiments are discussed below.

FIG. 1 is a modified photograph of one type of coordinate measuring machine 100 ("CMM 100") that may be configured in accordance with illustrative embodiments. As known by those in the art, the CMM 100, which is within some surrounding environment 103 (e.g., a clean room or an area near an assembly line), including a floor 190, measures an object 101 on its bed/table/base (referred to as "base 102"). Generally, the base 102 defines an X-Y plane that typically is parallel to the plane of the floor supporting the CMM 100.

Figure 1A:
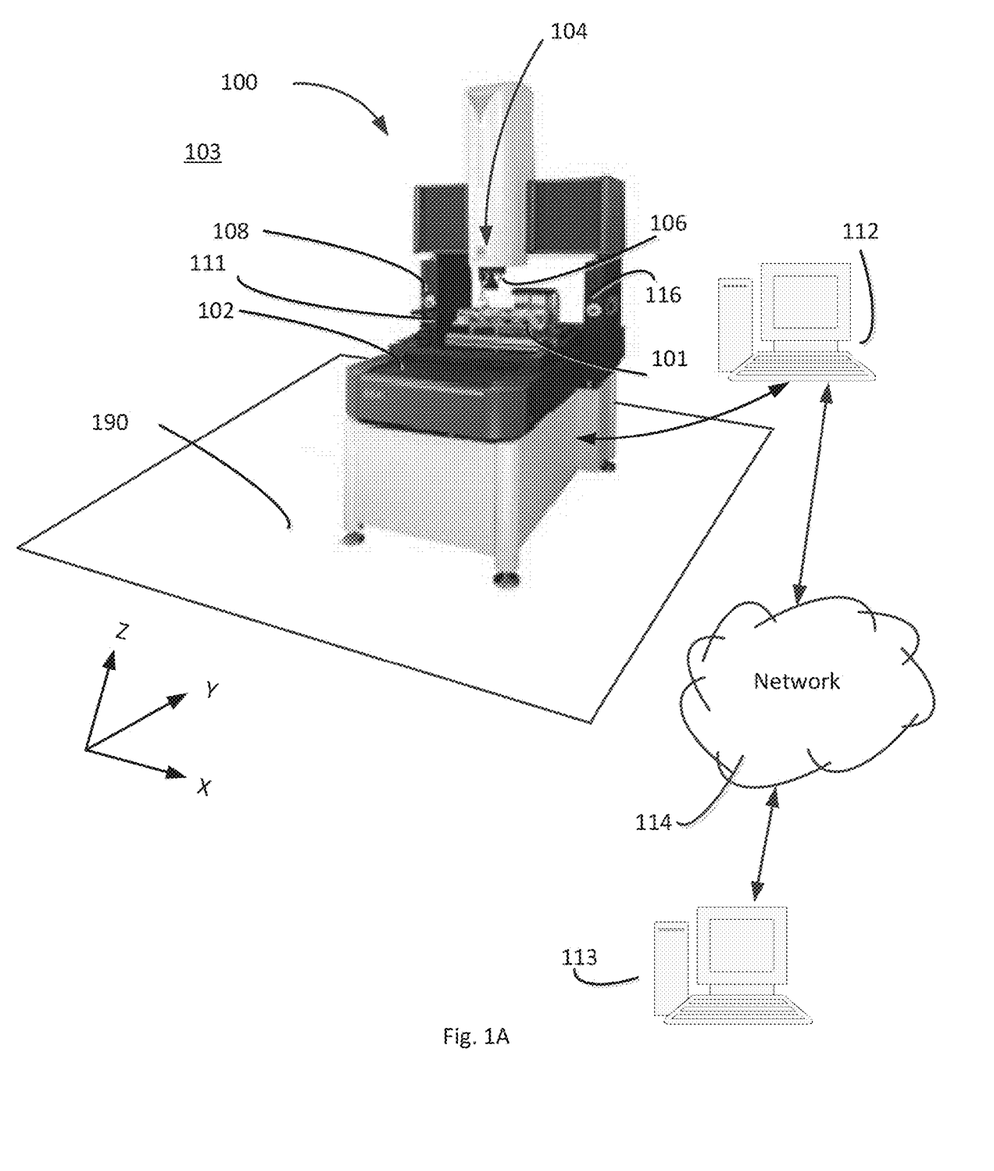
FIG. 1A schematically shows a coordinate measuring machine that may be configured in accordance with illustrative embodiments.

To measure the object 101 on its base 102, the CMM 100 has movable features 104 arranged to move a measuring device 106 (individually or collectively, a measuring apparatus), such as a mechanical, tactile probe (e.g., a touch trigger or a scanning probe in a standard CMM), a non-contact probe (e.g., using laser probes), or a camera (e.g., a machine-vision CMM), coupled with a movable arm 104. Alternately, some embodiments move the base 102 with respect to a stationary measuring device 106. Either way, the movable features 104 of the CMM 100 manipulate the relative positions of the measuring device 106 and the object 101 (or calibration artifact) with respect to one another to obtain the desired measurement. Accordingly, the CMM 100 can effectively measure the location of a variety of features of the object 101 or artifact.

The CMM 100 has a motion and data control system 108 ("control system 108," shown schematically in FIG. 1) that controls and coordinates its movements and activities. Among other things, the control system 108 includes computer processor hardware and the noted movable features 104. The computer processor 111 may include a microprocessor, programmable logic, firmware, advance control, acquisition algorithms, parts programs, and analysis algorithms. The computer processor 111 may have on-board digital memory (e.g., RAM or ROM) for storing data and/or computer code, including instructions for implementing some or all of the control system operations and methods. Alternately, or in addition, the computer processor 111 may be operably coupled to other digital memory, such as RAM or ROM, or a programmable memory circuit for storing such computer code and/or control data.

Alternately, or in addition, some embodiments couple the CMM 100 with an external or integral computer 112 ("host computer 112"). In a manner similar to the control system 108, the host computer 112 has a computer processor such as those described above, and computer memory in communication with the processor of the CMM 100. The memory is configured to hold non-transient computer instructions capable of being executed by the processor, and/or to store non-transient data, such as data acquired as a result of the measurements of the object 101 on the base 102.

Among other things, the host computer 112 may be a desktop computer, a tower computer, or a laptop computer, such as those available from Dell Inc., a tablet computer, such as the iPad available from Apple Inc., or a smartphone. The host computer 112 may be coupled to the CMM 100 via a hardwired connection, such as an Ethernet cable, or via a wireless link, such as a Bluetooth link or a WiFi link. The host computer 112 may, for example, include software to control the CMM 100 during use or calibration, and/or may include software configured to process data acquired during a calibration process. In addition, the host computer 112 may include a user interface configured to allow a user to manually operate the CMM 100.

To facilitate communications, the computer 112 may be connected in some manner to a larger network 114, such as a local area network or a wide area network. For example, the network 114 in FIG. 1 may include a local area network connected to the Internet. Accordingly, the computer 112 may communicate with remote devices 113 (e.g., computers, servers, routers, remote computers, etc.) via the network 114.

Because their relative positions are determined by the action of the movable features 104, the CMM 100 may be considered as having knowledge about data relating to the relative locations of the base 102, and the object 101 or artifact, with respect to its measuring device 106. More particularly, the computer 112 or other logic controls and stores information about the motions of the movable features 104. Alternately, or in addition, the movable features 104 of some embodiments include position sensors that sense the locations of the table and/or measuring device 106, and report that data to the computer 112 or related logic. The information about the motions and positions of the table and/or measuring device 106 of the CMM 100 may be recorded in terms of a two-dimensional (e.g., X-Y; X-Z; Y-Z) or three-dimensional (X-Y-Z) coordinate system referenced to a point on the CMM 100.

In accordance with illustrative embodiments of the invention, the CMM 100 also has at least one sensor 116 for sensing a quality of 1) the surrounding environment 103, 2) the object 101 it is measuring, and/or 3) the CMM 100 itself. The quality can be any quality that may be useful to the CMM 100 for performing its functions. For example, as suggested above, those qualities may include, among other things, one or more of temperature, vibration, humidity, movement of a portion of the CMM 100, pressure, light, and composition of the air in vicinity of CMM 100. Accordingly, those sensors 116 may include, among other things, a thermal camera, a temperature sensor, an inertial sensor (e.g., a MEMS accelerometer or gyroscope), a tilt sensor, a humidity sensor, a pressure sensor, a light sensor, and an air sensor. Other sensors may include proximity sensors, magnetic sensors (e.g., Hall sensor other related), acoustic sensors, current or voltage sensors, color sensors, frequency sensors, distance sensors, and capacitive and piezoelectric sensors, among others. As discussed in greater detail below with regard to FIG. 2, the control system 108 uses this sensing information to control the CMM 100 and/or generate alerts to some sensed condition.

Illustrative embodiments thus control the operation of the CMM 100 as a function of some sensed condition. Related embodiments generate an alarm or alert signal in response to a sensed condition. To that end, FIG. 2 shows a process used by the CMM 100 of FIG. 1 (or other CMM) to measure an object 101 in accordance with various embodiments of the invention.

It should be noted that this process is substantially simplified from a longer process that normally would be used to measure the object 101. Accordingly, the process of measuring the object 101 may have other steps, such as positioning the object 101 on the base 102, which those skilled in the art likely would use. In addition, some of the steps may be performed in a different order than that shown, or at the same time. Those skilled in the art therefore can modify the process as appropriate. Moreover, although discussed in terms of the CMM 100 of FIG. 1, various embodiments of FIG. 2 apply to CMMs other than that of FIG. 1. Accordingly, discussion of the process of FIG. 1 in terms of the CMM 100 of FIG. 1 is for illustrative purposes only.

Figure 2:
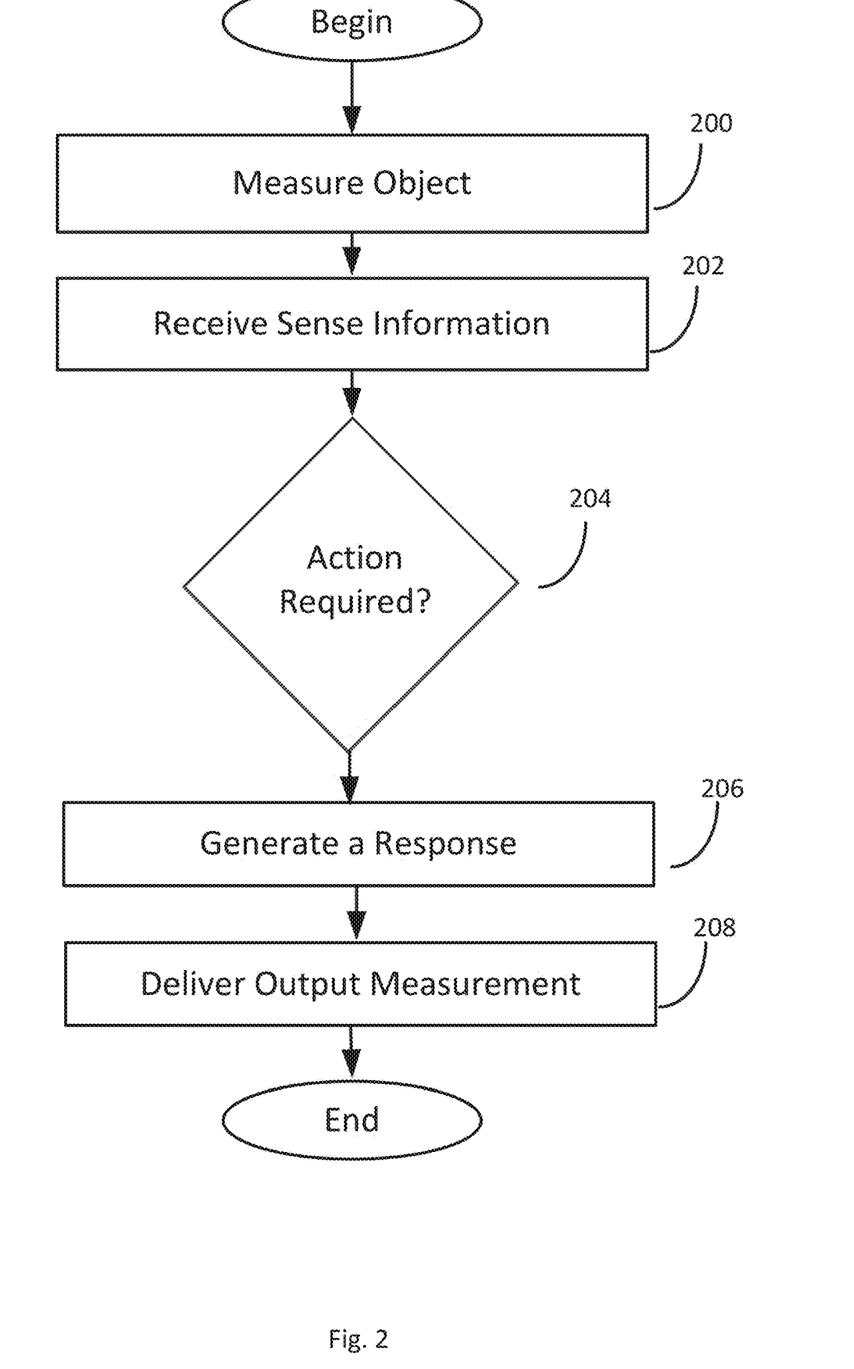
FIG. 2 shows a process of controlling the coordinate measuring machine of FIG. 1 during the measurement process.

The process of FIG. 2 begins at step 200, in which the CMM 100 measures the object 101 in a conventional manner. For example, the CMM 100 may cause its measuring device 106, such as a tactile probe or laser scanning device, to traverse along some pre-specified dimension of the object 101. Before, during, or after this step, however, the CMM 100 may perform steps 202 and 204. Specifically, the process may receive sensing information from the sensors 116 (step 202). In fact, the process may receive the sensing information continuously during the entire process, or at pre-specified times during the process.

The functional modules noted above of the CMM 100 may use the received sensing information to determine if such information impacts the measurement process (step 204). More specifically, the functional modules determine if the sensing information indicates that the measurement of the object 101 has an error that requires some responsive action. As noted above, that sensing information can relate to any one or more of the object 101, the CMM 100, or the surrounding environment 103 of the CMM 100.

The sensing information can include any of a wide variety of sensory data. Repeating the above examples, that sensory data may include, among other things, one or more of temperature, vibration, humidity, movement of a portion of the CMM 100, pressure, light, and composition of the air in vicinity of CMM 100. Those skilled in the art can use other sensors 116 to detect other sensor data and thus, discussion of the specific sensing data and sensors 116 is exemplary and not intended to limit all embodiments.

Accordingly, at step 204, the process determines if the received sensing information impacts the object 101, the CMM 100, or the process in a manner that requires some prescribed action. Adding to the above example, if the sensor 116 includes a thermal camera, then the process may obtain the actual temperature of the object 101 in real time. Using the known coefficient of thermal expansion of the object 101, the CMM functional modules may model the approximate change in shape and size of the object 101 in response to the actual temperature of the object 101. This increase in temperature may be compared to the calculated difference in size when the object 101 is at a prescribed temperature, such as the temperature at which the object 101 will operate during its intended use.

To that end, to perform step 204, the computer 112, internal logic, and/or control system 108 (for simplicity, also referred to as "functional modules") obtains the actual precision of the CMM 100, the manufacturing tolerance of the object 101, the actual measurement of the object 101, and the appropriate sensory data from step 202. For example, 1) the CMM 100 may have a precision to the nearest millimeter, 2) the manufacturing tolerance of the object 101 may be plus or minus five millimeters, and 3) the object 101 may be modeled to have an idealized size and shape based on the temperature and its coefficient of thermal expansion. Using this information, the functional modules determine if action is necessary.

If action is necessary based on pre-specified rules for the CMM application, the process continues to step 206, which generates an appropriate, prescribed response. This response can be any of a wide variety of steps, processes, or workflows as deemed appropriate for the CMM application. For example, the response may include instructions causing the CMM 100 to measure the object 101 again. Another response may include sounding an audible or visual alarm in the vicinity of the CMM 100 or in some remote area. Another response may include generating a message that the computer 112 routes/forwards/transmits to a remote device across a network. Such a message may include, among other things, a text message, an e-mail, a facsimile message, a tangible written message, or other message indicating that some condition has occurred (e.g., an action requiring a response), or other relevant responsive information. For example, the message may indicate that the CMM 100 has experienced a vibration exceeding a prescribed threshold, requiring attention immediately.

Returning to step 204 the process skips step 206 if action is not required. After generating the response and making an appropriate response, the process concludes at step 208, which delivers the output measurement of the object 101. This output measurement may include a revised measurement (e.g., an adjusted measurement) in response to step 206.

Accordingly, continuing with the above example having the noted manufacturing tolerance and CMM precision, the functional modules use the object coefficient of thermal expansion to model the size and shape of the object 101 using the temperature detected by the thermal camera (e.g., 116). To illustrate various embodiments, below are several different examples of how the process may respond to certain instances with regard to increasing object temperature.

Example 1 as a result of the sensing information, the modeled size and shape of the object 101 is 0.1 millimeters larger in a measured dimension than a nominal model of the object 101, CMM precision is 1 millimeter, object tolerance is plus or minus 5 millimeters from nominal, and actual measurement in the measured dimension is 2 millimeters greater than nominal.

In this case, it is likely that the temperature change will not have a substantial enough impact on the actual measurement because the small change at most would increase the CMM reading by 1 millimeter. Even in that case, the final measurement at most would be three millimeters greater than nominal, which still is within the object tolerance. Thus, no action is necessary in this example if the process is measuring the object 101 to confirm it is within manufacturing tolerances.

Example 2 as a result of the sensing information, the modeled size and shape of the object 101 is 8 millimeters larger in a measured dimension than a nominal model of the object 101, CMM precision is 0.1 millimeters, object tolerance is plus or minus 5 millimeters from nominal, and actual measurement in the measured dimension is 1 millimeter greater than nominal.

In this case, it is likely that the temperature change will have an impact on the actual measurement because the actual measurement, less the larger size of the dimension, exceeds the object tolerance. Moreover, the CMM precision is sufficient to detect the substantial majority of this change. Thus, if the process is measuring the object 101 to confirm it is within manufacturing tolerances, then this example may require an action. For example, the CMM 100 may automatically re-measure the object 101, or to send an alert message to a remote computer device.

In addition, some embodiments that detect a potentially problematic issue as a result of the sensing information may adjust the measured value to logically compensate for the problematic sensed information. For example, those embodiments may detect that an elevated temperature increased the measured dimension by 1 millimeter. Such embodiments thus may determine the amount of error (e.g., an "error amount") based on the received sensing information (i.e., 1 millimeter in this example), and/or based on a specified quantity for the measured value, and then apply that error to the measurement to determine an adjusted measurement. Such an adjustment may be made to the measured value, to produce an adjusted value, before the adjusted value is stored in memory or transmitted to a computer. This adjusted measurement reflects a more accurate measurement than a measurement taken without the benefit of the problematic sensing information. In this example, the system may subtract 1 millimeter from the measured dimension to arrive at the more accurate measurement.

Conditions in, or changes in, the CMM's environment, or an object to be measured by a CMM, can negatively impact the operation of the CMM measuring the object.

For example, the object to be measured, and/or components of the CMM, may each have thermal coefficient of expansion that may change their physical dimensions. For example, a CMM may have a mechanical arm that moves a probe to measure an object. Thermal expansion or contraction of the arm and/or the probe may cause the CMM to incorrectly assess the location of the probe when it contacts the object, and therefore incorrectly measure the object.

Similarly, thermal expansion or contraction of the object being measured changes the dimensions of the object. Consequently, even if the CMM is perfectly accurate, the measured dimensions of the object will be larger (e.g., if the object has expanded) or smaller (e.g., if the object has contracted) than the object's nominal size.

Figure 1B:
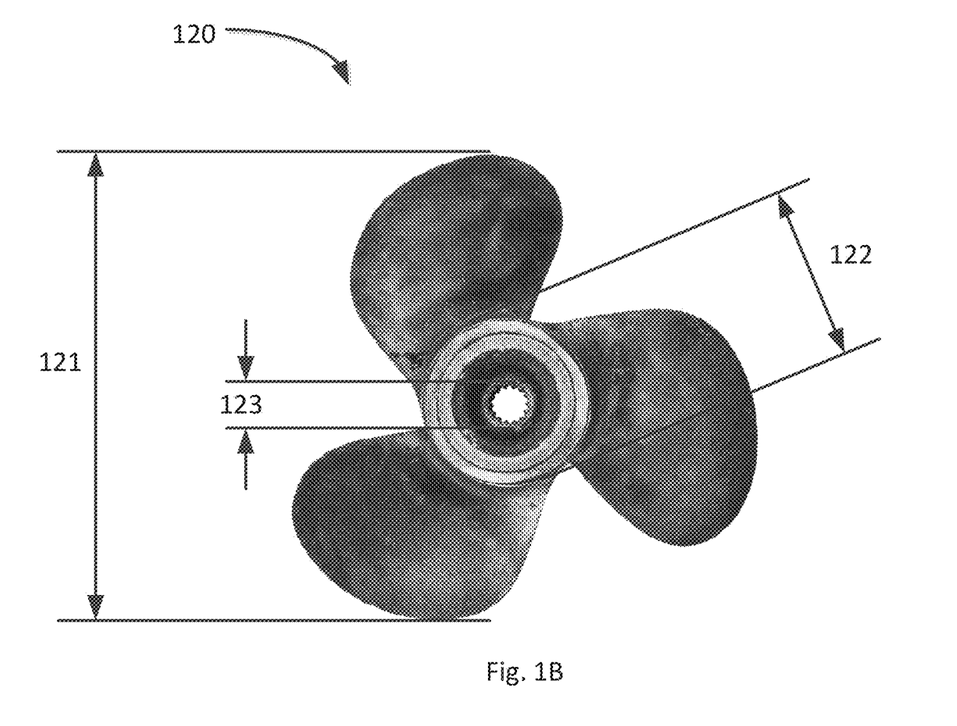
FIGS. 1B-1E schematically illustrate objects that may be measured by a coordinate measuring machine.
Figure 1C:
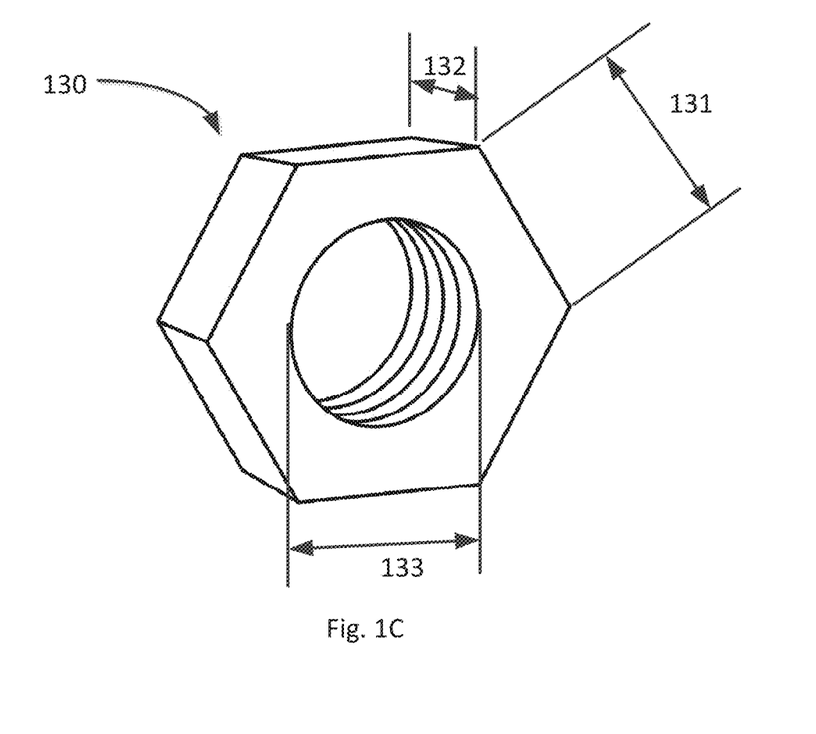
Figure 1D:
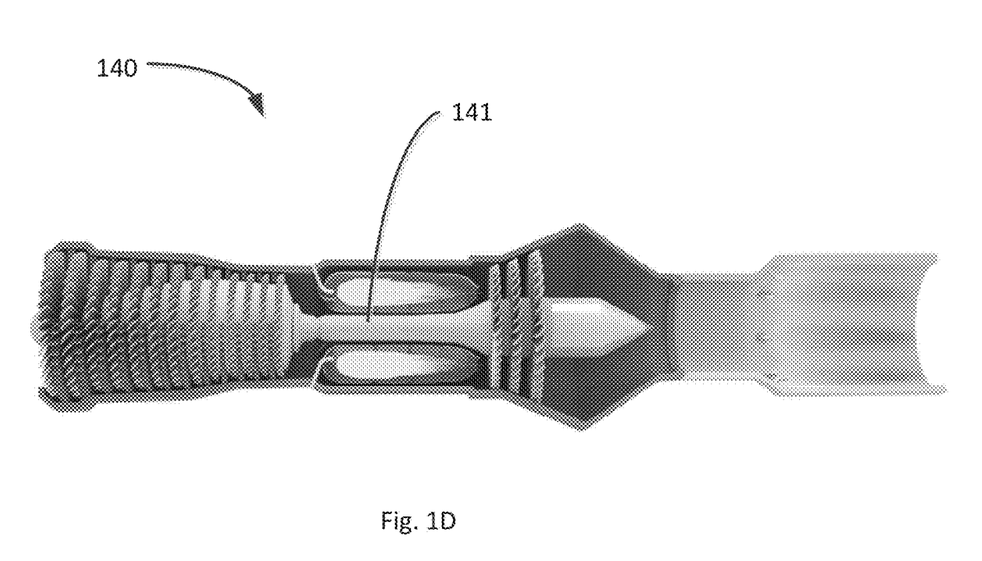

Variations in the dimensions of the object (e.g., from the object's nominal, expected, or specified dimensions) may cause the object to incorrectly meet, or fail to meet, its specification. For example, if the object is a part 141 of a jet engine 140, as schematically illustrated in FIG. 1D for example, and the part 141 is required to have a diameter of 10 cm with a tolerance of +/−0.1 cm at room temperature, and if the part is measured at temperature higher than room temperature, thermal expansion may cause the part's diameter to expand to 10.2 cm. Consequently, a measurement by a CMM would conclude that the part fails to meet its required specification, even if the part would meet the specification if measured at room temperature.

Conversely, if a defective engine part 141 has a diameter of only 9.8 cm at room temperature, but it is measured at a higher temperature that causes the part 141 to have a measured diameter of 9.95 cm when the part is measured, then measurement by a CMM would conclude that the part meets its required specification, even if the part 141 would fail to meet the specification if measured at room temperature. Therefore, some embodiments measure the temperature of the object before, during, or after measurement by a CMM.

Some objects may be measured at a temperature higher (or lower) than the ambient temperature of the CMM's environment. For example, the operating environment of an airplane engine part 141 might be at a temperature of 200 degrees C., and the part's specification may therefore specify the part's dimensions at 200 degrees C. The part's specification, or a customer requirement, may further specify that the part's dimensions be verified by at CMM while the part is at 200 degrees C., or at room temperature (e.g., 25 degrees C.), or some other temperature other than room temperature, or some other temperature other than the ambient temperature of the CMM's environment.

As another example, the operating environment of a part 130 (FIG. 1C) of a cryogenic freezer may be −100 degrees C., and the part's specification may therefore specify the part's dimensions (e.g., 131; 132; 133) at −100 degrees C., and may further specify that the part's dimensions (131; 132; 133) be verified by at CMM while the part is at −100 degrees C., or some other temperature other than room temperature or the ambient temperature of the CMM's environment.

Some objects may be measured at a more than one temperature. For example, a boat propeller 120, as schematically illustrated in FIG. 1B, may have an operating environment that ranges from tropical water at 30 degrees C. to arctic water at 0 degrees C. The propeller's specification may include dimensions (e.g., 121; 122; 123) at either or both temperatures, and/or may include a limit on the changes of the propeller's dimensions (121; 122; 123) between those temperature extremes. Further, the specification, or a customer requirement, may require that a CMM measure the dimensions (121; 122; 123) of the propeller 120 at those temperature extremes, and/or at any one or more temperature points in-between.

In these examples, the temperature specified for verifying the object's dimensions may be may be referred to at the object's "verification temperature."

Figure 3:
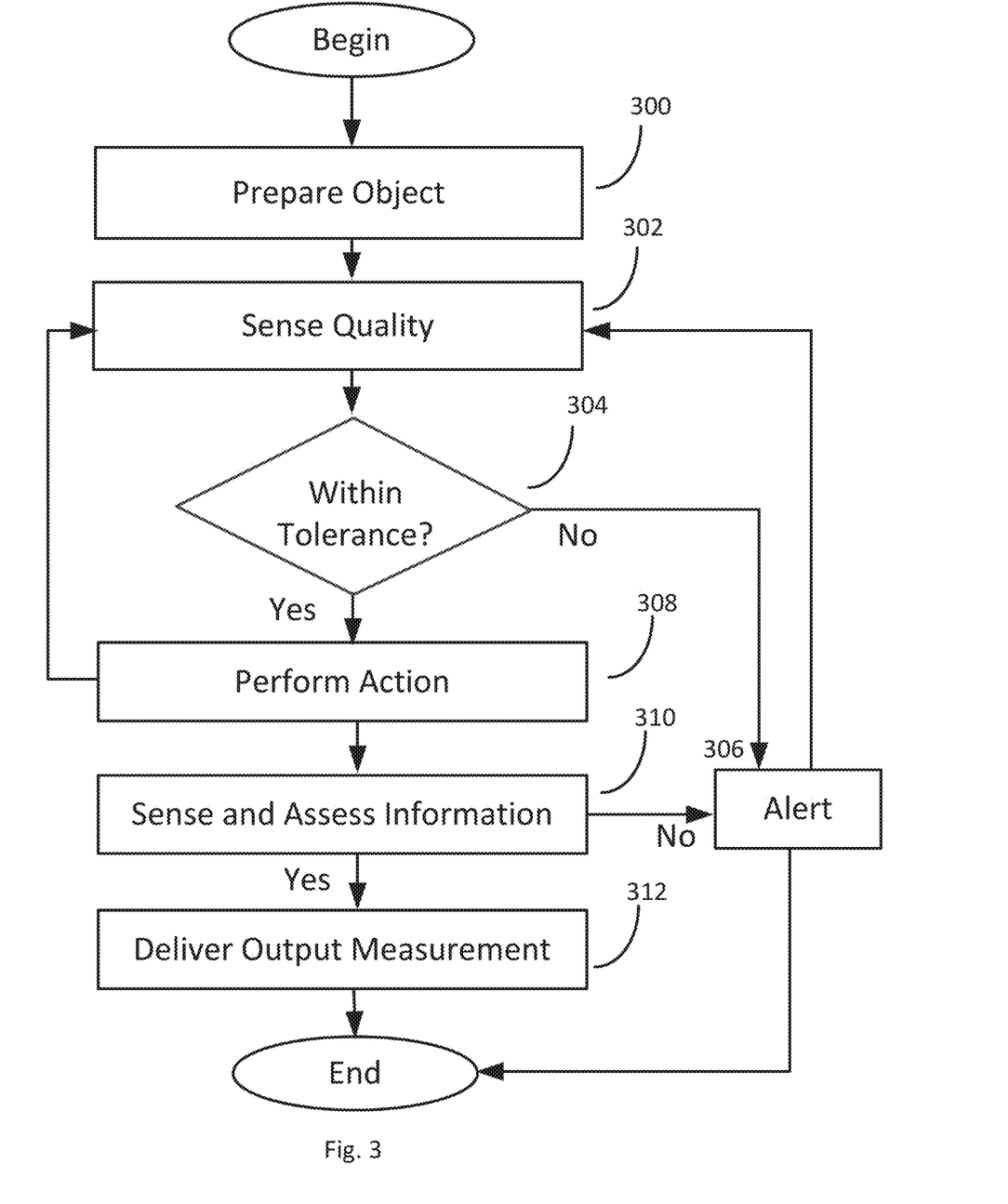
FIG. 3 shows another embodiment of a process of controlling the coordinate measuring machine of FIG. 1 during the measurement process.

FIG. 3 schematically illustrates a flow chart of an embodiment of a process for measuring an object while taking environmental factors into account. The method is described below in the context of measuring an object having a verification temperature, but is not limited to measuring temperature, and may apply to a variety of other qualities relating to the object being measured, the CMM, or the CMM's operating environment.

At step 300, the object is prepared to be measured. Preparing the object may involve at least placing the object on the CMM for measurement, and may involve raising or lowering the temperature of the object to at or near its verification temperature.

At step 302, a sensor associated with the CMM senses a quality of (or information about) the object or the environment in which the object is to be measured. In keeping with the foregoing examples, the quality sensed in one embodiment is object's temperature. The sensed quality (in this case, the measured temperature) is then assessed at step 304. In the foregoing examples, the measured temperature is compared to the object's verification temperature. In some embodiments, the sensing of a quality at step 302 may be performed before, and/or during (e.g., at the time of execution), and/or after measuring an object with the coordinate measurement machine 100. The sensor output (measured data) may be provided to, and received by, functional modules (e.g., processor 111 in the controller 108), and/or a computer (e.g., computer 112) associated with the coordinate measurement machine 100, for the assessment of step 304.

If the measured temperature is at the verification temperature, or is within an acceptable tolerance of the verification temperature, then the method proceeds to step 308, at which an action is performed. For example, the action 308 may cause the CMM to measure one or more dimensions of the object. In some embodiments, the action at step 308 may be a mechanical action such as measuring the object with a contact probe or a non-contact probe. The acceptable tolerance of the measured temperature, relative to the verification temperature, may be a function of the object's specification, customer requirement, intended operating environment, or otherwise according to the object's intended end use, and therefore may be determined by the object's designer.

The process then proceeds to step 312, which delivers the measurement data collected at step 308 to a computer, database, or user. Optionally, the process may return from step 312 back to step 308 to measure the object a second time.

If the object is not at verification temperature, the CMM may alert an operator at step 306, and/or refrain from measuring the object. Alternately, in some embodiments, if the object is not at verification temperature the process returns to step 302.

Optionally, after performing the action at step 308, the CMM may, sense information about the object again, at step 310 (i.e., in the foregoing examples, the temperature of the object), and assess the sensed quality against specification (e.g., verification temperature). If the sensed quality is still within specification (e.g., the measured temperature is at the verification temperature, or is within an acceptable tolerance), then the process proceeds to step 312 as described above, and otherwise proceeds to step 306, from which the process may terminate, or return to step 302 and measure the object a second time. In some embodiments, the process loops from step 308 to step 302 while the coordinate measuring machine 100 takes additional measurement, so as to continuously monitor the quality (e.g., temperature) of the object or its environment.

Although the process of FIG. 3 is described above in the context of temperature of the object being measure, other qualities may be sensed at step 302 and assessed at step 304 and/or step 310, such as other qualities of the object or the environment, as described herein, to name but a few examples.

Further, although the examples above each describe the process of FIG. 3 using a single quality of interest, some embodiments may measure more than one quality of interest. For example, some embodiments may involve sensing both temperature and humidity at step 302, assess each of those qualities at step 304, and proceed with the remaining steps based on those assessments.

Figure 1E:
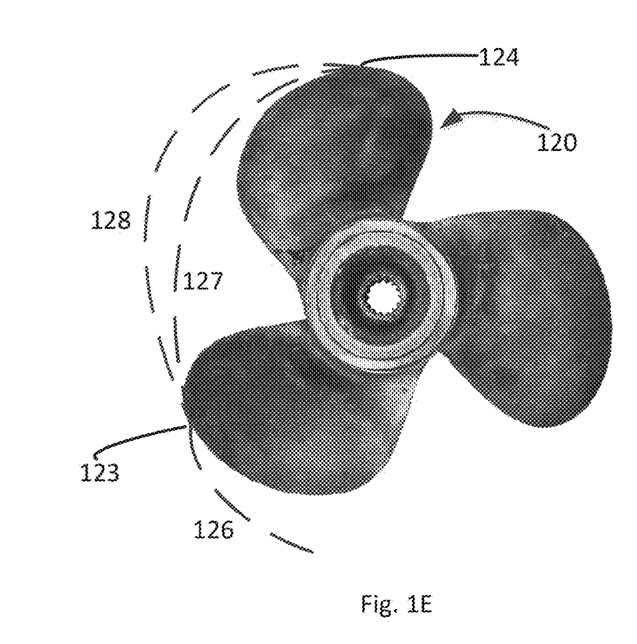

In some embodiments, the CMM determines the process (e.g., one or more mechanical actions) by which it will measure the object based on the measured quality. As an illustrative example schematically illustrated in FIG. 1E, if the object is a boat propeller 120 at room temperature (for the sake of example, 25 degrees C.), the CMM may direct a measuring probe to measure points 123 and 124 of the propeller 120 by first moving the probe along path 126 to point 123, then along path 127 to point 124. However, if the temperature of the propeller 120 is 100 degrees C., such that some dimensions of the propeller may be larger than they would be at room temperature, the CMM may move the probe to point 124 along path 128 instead of along path 127, to reduce the risk of inadvertent contact with another point on the propeller 120.

Humidity:

In some embodiments, the quality of interest is the humidity of the environment in which the CMM operates when measuring the object, for example if the humidity in the environment would affect the dimensions of the object to be measured, or affect some aspect of the CMM or its operation. As such, a specification for the object, or its manufacture, or a customer's requirement, may specify a standard (e.g., the level of humidity or range of acceptable levels of humidity) at which the dimensions of the object may be evaluated.

In such embodiments, a humidity sensor associated with the CMM senses humidity at step 302. That sensed quality is then assessed against the standard for that quality, at step 304. If the sensed humidity meets the standard, or is within an acceptable tolerance of the standard, then the method proceeds to step 308, at which an action is performed. Otherwise, the process proceeds to step 306 as described above.

Vibration or Motion of the CMM:

In some embodiments, the quality of interest is vibration or other motion of the CMM. Vibration of the object, or the CMM or the CMM's environment (e.g., from an earthquake, or the traffic of heavy vehicles nearby, or event from moving parts of the CMM itself) could affect the object to be measured, or affect some aspect of the CMM or its operation. For example, vibration of the object might produce motion at a point on a surface of the object where the CMM is taking a measurement, resulting in an inaccurate measurement. Even a small amplitude vibration at or near an object's resonant frequency can cause the object to move to a degree that measurement of a point on the object relative to the CMM or relative to another point on the object would be compromised and unreliable. Vibration of the CMM, or the floor on which the CMM stands, might produce motion in the CMM's measuring probe or camera, again resulting in an inaccurate measurement.

Consequently, a specification for the object, or its manufacture, or a customer's requirement, may specify a standard (e.g., the amplitude of vibration, frequency of vibration, or range of acceptable amplitudes or frequencies of vibration, of the object being measured, the CMM, or the CMM's operating environment) at which the dimensions of the object may be evaluated.

In such embodiments, a vibration sensor associated with the CMM senses amplitude and/or frequency of vibration at step 302. The vibration sensor may be, for example, an accelerometer or gyroscope. That sensed quality is then assessed against the standard for that quality, at step 304. If the sensed vibration meets the standard, or is within an acceptable tolerance of the standard, then the method proceeds to step 308, at which an action is performed. Otherwise, the process proceeds to step 306 as described above.

Temperature of Air:

In some embodiments, the quality of interest is the temperature of air in the environment in which the coordinate measuring machine is measuring, is preparing to measure, an object. The temperature of such air may affect the accuracy of one or more sensors, such as acoustic sensors for example, or may affect the accuracy of such measurements, for example if the measurement depends on the timing of receipt of an acoustic signal travelling through the air, since the speed of sound in air is a function of the air temperature.

In such embodiments, an air temperature sensor (e.g., a thermometer) associated with the CMM senses the air temperature at step 302. The operation of the CMM, or the processing of data measured by a sensor, may be adjusted based on the air temperature.

Composition of Fluid:

In some embodiments, the quality of interest is composition of a fluid in the environment in which the coordinate measuring machine is measuring, is preparing to measure, an object. For example, the composition of a gas in the environment may affect the operation of a coordinate measuring machine that employs an acoustic sensor if the composition of the gas affects the speed of sound in the gas such that the coordinate measuring machine would misinterpret distances travelled by an acoustic (e.g., ultrasonic) wave sensed in the gas by the sensor.

In such embodiments, a gas sensor (116) may sense the composition of such gas before, and/or during, and/or after measuring an object using the coordinate measuring machine. In another example, a gas sensor (116) may sense the gas to assess whether the gas is flammable, such that electrical signals in the coordinate measuring machine, or a spark caused by touching the object being measured, might ignite the gas. In such embodiments, the coordinate measuring machine may determine whether to measure the object, or whether to terminate measurement of the object, or whether to refrain from measuring the above, and optionally trigger an alert.

Pressure:

In some embodiments, the quality of interest is pressure, for example if the pressure of air (or other gas) in the environment would affect the dimensions of the object to be measured (for example, if the object contains a sealed volume), or affect some aspect of the CMM or its operation. As such, a specification for the object, or its manufacture, or a customer's requirement, may specify a standard (e.g., the level of pressure or range of acceptable levels of pressure) at which the dimensions of the object may be evaluated.

In such embodiments, a pressure sensor (116) associated with the CMM senses pressure of air (or other gas) in the environment at step 302. That sensed quality is then assessed against the standard for that quality, at step 304. If the sensed pressure meets the standard, or is within an acceptable tolerance of the standard, then the method proceeds to step 308, at which an action is performed. Otherwise, the process proceeds to step 306 as described above.

Light:

In some embodiments, the quality of interest is light. For example, in an optical CMM that measures an object using a camera or other optical sensor, the quantity or quality (e.g., angle of light source relative to the optical sensor; spectrum of light) of light in the environment might negatively affect the ability of the CMM to measure an object. As such, a specification for the object, or its manufacture, or a customer's requirement, may specify a standard (e.g., one or more qualities light, or ranges of such qualities) at which the dimensions of the object may be evaluated.

In such embodiments, a light sensor (116) associated with the CMM senses light at step 302. That sensed quality is then assessed against the standard for that quality, at step 304. If the sensed light meets the standard, or is within an acceptable tolerance of the standard, then the method proceeds to step 308, at which an action is performed. Otherwise, the process proceeds to step 306 as described above.

Another embodiment detects whether the CMM has been subject to a crash during measurement of an object. Such a crash may occur as a result of a part of the CMM hitting the object, or hitting another part of the CMM, or by an external force hitting the CMM or the object, to name but a few examples. A crash during measurement may cause a measurement error, for example if the crash cause relative motion between a CMM prove and the object being measured, or may invalidate the entire measurement, for example if the crash causes the object to change its position relative to the CMM before the measurement is complete.

Figure 4:
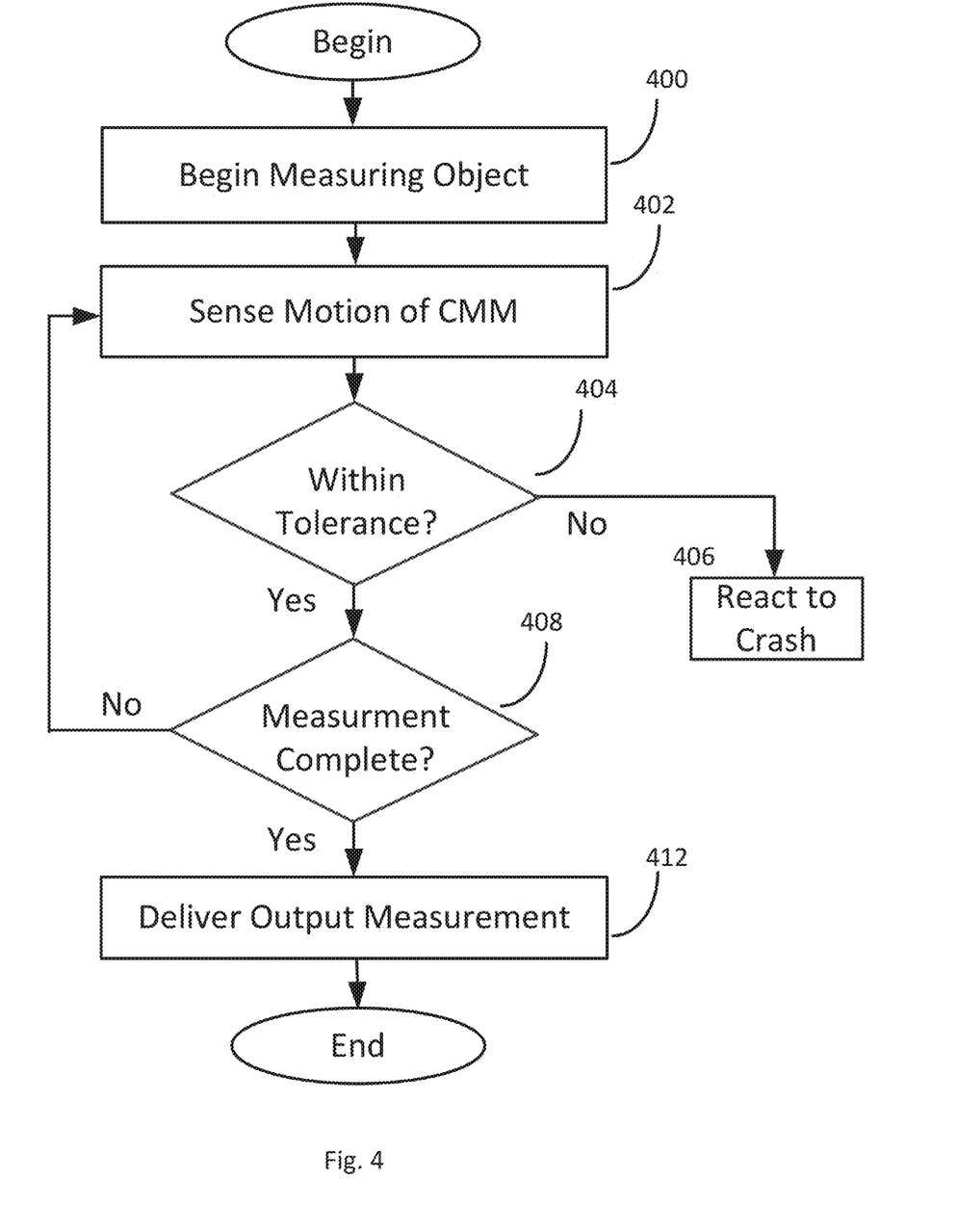
FIG. 4 shows another embodiment of a process of controlling the coordinate measuring machine of FIG. 1 during the measurement process.

A method of operating a CMM with crash detection is schematically illustrated in FIG. 4. At step 400, the CMM begins measuring the object. Periodically, or continuously, during measurement of the object, a crash sensor (116) associated with the CMM monitors motion of the CMM to detect sudden shocks that might be indicative of a crash.

The crash sensor 116 may be an accelerometer or gyroscope, for example. In some embodiments the crash sensor 116 may be the same sensor used to detect vibration (which may be referred to as the vibration sensor), but in other embodiments, the sensor 116 is independent of the sensor used to detect vibration. This may be because the vibration sensor and the crash sensor may have different or incompatible sensitivities. For example, a vibration sensor may be sensitive only to vibrations having frequencies and/or amplitudes that are different than those to which the crash sensor is sensitive. Alternately, or in addition, this may be because the vibration sensor may be deployed to continually monitor for vibration, and thus be temporally unavailable to monitor for a crash, and/or the crash sensor may be deployed to continually monitor for a crash, and thus be temporally unavailable to monitor for a vibration.

At step 402, the crash sensor 116 senses motion of the CMM, and the control system 108 assess the sensed motion at step 404 to determine whether there has been a crash, e.g., whether the motion exceeds a threshold or tolerance that indicates a crash.

If the crash sensor 116 does not detect a crash, then the CMM determines whether the CMM's measurement of the object is complete. If the measurement of the object is not yet complete, then the method loops back to step 402 and continues to sense motion of the CMM. If the measurement of the object is complete, then the method proceeds to step 412 at which it delivers to output measurements, for example to a computer memory.

Conversely, if the crash sensor does detect a crash, then the CMM proceeds to step 406, at which the CMM may terminate its measurement of the object, and/or alert an operator that there has been a crash.

The concepts described herein may be used in conjunction with a wide variety of sensors. Without limiting the generality of the foregoing, such sensors include an air sensor (to detect air pressure; and/or particulates in the air); a humidity sensor; a temperature sensor; a motion or inertial sensor (vibration/crash); a light sensor; a proximity sensor; a magnetic sensor (e.g., a hall sensor, or otherwise); a pressure sensor (e.g. to detect the weight of an object to be measured, or the weight of all objects on a CMM's base, for example to detect whether such weight is the weight expected for the object to be measured; or exceeds such weight which may indicate the presence of more than one object, or the presence of an incorrect object; or is less than such expected weight, which may indicate the presence of an incorrect object, or the absence of any object); a sound pressure sensor (acoustic); electrical current sensor; color sensor; frequency sensor; capacitive sensor; or a distance sensor.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1: a method of measuring an object using a coordinate measuring machine, the method including: receiving sensing information relating to motion of the coordinate measuring machine; determining whether the motion indicates one of a crash of an object into the coordinate measuring machine or a crash of a portion of the coordinate measuring machine into itself or something else; and taking action in response to detection of a crash.

P2: the method according to P1, wherein determining whether the motion indicates a crash includes comparing an amplitude of a received sensing information to a threshold amplitude, the threshold amplitude being an amplitude above which motion of the coordinate measuring machine indicates a crash.

P3: the method according to any of P1 to P2, further including beginning measurement of the object with the coordinate measuring machine prior to receiving sensing information relating to motion of the coordinate measuring machine.

P4: the method according to any of P1 to P3, in which the action includes terminating measurement of the object by the coordinate measuring machine.

P5: the method according to P1, further including continuously receiving sensing information relating to motion of the coordinate measuring machine, and determining whether the motion indicates one of a crash of an object into the coordinate measuring machine or a crash of a portion of the coordinate measuring machine into itself or something else, until measurement of the object by the coordinate measuring machine is complete.

P11: A method of measuring an object using a coordinate measuring machine, the coordinate measuring machine being in an environment, the method including (a) receiving first sensing information from a first sensor; (b) receiving second sensing information from a second sensor; and (c) controlling the coordinate measuring machine to perform, based on the first sensing information and the second sensing information, a specified mechanical action.

In accordance with one embodiment of the invention, a method of measuring an object uses a coordinate measuring machine positioned within an environment (e.g., a clean room). The method receives sensing information relating to at least one of the object, the coordinate measuring machine, and the environment. Next, the method controls the coordinate measuring machine to perform, based on the sensing information, a specified mechanical action.

Among other things, the method may control the coordinate measuring machine to measure the object a second time. Alternatively or in addition, the coordinate measuring machine may cause an alert to be generated. In the latter case, the coordinate measuring machine may include an interconnected computer device configured to generate the alert. In some instances, the alert can include at least one of an alarm and a message transmitted to a remote computer.

The sensing information may include information relating to at least one of temperature, vibration, humidity, movement of a portion of the coordinate measuring machine, pressure, light, and composition of fluid in vicinity of coordinate measuring machine. To that end, the coordinate measuring machine may have at least one of a temperature sensor, an inertial sensor, a humidity sensor, a pressure sensor, a light sensor, and an air sensor.

Ultimately, the method measures the object using the coordinate measuring machine. Moreover, the method may measure the object using the coordinate measuring machine to produce a measurement, determine an error amount based on the received sensing information, and apply the error amount to the measurement to determine an adjusted measurement.

Like other objects, the object may have a size tolerance. The coordinate measuring machine also may have a precision. The method then may control the coordinate measuring machine as a function of the size tolerance of the object and the precision of the coordinate measuring machine.

In accordance with another embodiment, a coordinate measuring machine for measuring an object in an environment has a base configured to support the object, and a measuring apparatus configured to measure the object. The coordinate measuring machine also has at least one sensor configured to detect sensing information relating to at least one of the object, the coordinate measuring machine, and the environment. In addition, the coordinate measuring machine also has a controller operatively coupled with the at least one sensor. The controller is configured to control the coordinate measuring machine to perform, based on the sensing information, a specified mechanical action.

In accordance with other embodiments, a method of measuring an object using a coordinate measuring machine in an environment receives sensing information relating to at least one of the object, the coordinate measuring machine, and the environment. Next, the method produces an alarm as a function of the sensing information.

Illustrative embodiments of the invention are implemented as a computer program product having a computer usable medium with computer readable program code thereon. The computer readable code may be read and utilized by a computer system in accordance with conventional processes.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a non-transient computer program product for use with a computer system. Such implementation may include a series of computer instructions fixed either on a tangible, non-transitory medium, such as a computer readable medium (e.g., a diskette, CD-ROM, ROM, flash memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of measuring an object using a coordinate measuring machine, the coordinate measuring machine being in an environment, and wherein the object has a size tolerance and the coordinate measuring machine has a precision, the method comprising:
   providing a coordinate measuring machine comprising:
      at least one sensor configured to detect sensing information relating to the environment; and
      a controller operatively coupled with the at least one sensor, the controller configured to control the coordinate measuring machine to perform, based on the sensing information, the size tolerance of the object and the precision of the coordinate measuring machine, a specified action;
   receiving, by the controller from the at least one sensor, sensing information relating to the environment; and
   controlling, by the controller, the coordinate measuring machine to perform, based on the sensing information, and as a function of the size tolerance of the object and the precision of the coordinate measuring machine, a specified action.

2. The method as defined by claim 1 wherein controlling the coordinate measuring machine comprises controlling the coordinate measuring machine to measure the object a second time.

3. The method as defined by claim 1 wherein the specified action is a mechanical action.

4. The method as defined by claim 1 further comprising measuring the object using the coordinate measuring machine.

5. The method as defined by claim 1 wherein the coordinate measuring machine includes a light sensor.

6. The method as defined by claim 1 wherein the coordinate measuring machine includes a light sensor, and receiving sensing information relating to the environment comprises measuring, with the light sensor, the quantity of light in the environment.

7. The method as defined by claim 1 wherein the coordinate measuring machine includes a light sensor, and receiving sensing information relating to the environment comprises measuring, with the light sensor, a spectrum of the light in the environment.

8. The method as defined by claim 1 wherein controlling the coordinate measuring machine comprises causing an alert to be generated.

9. The method as defined by claim 1 further comprising:
   measuring the object using the coordinate measuring machine to produce a measurement;
   determining an error amount based on the received sensing information; and
   applying the error amount to the measurement to determine an adjusted measurement.

10. The method as defined by claim 1 wherein the sensing information relates to light in the environment.

11. The method as defined by claim 1 wherein the specified action is a mechanical action, and the received sensing information comprises a temperature of the object at the time of execution of the specified mechanical action.

12. The method as defined by claim 1 wherein the specified action is a mechanical action, and the received sensing information comprises a temperature of air in the vicinity of the object at the time of execution of the specified mechanical action.

13. A coordinate measuring machine for measuring an object in an environment, which object has a size tolerance, the coordinate measuring machine having a precision and comprising:
   a base configured to support the object;
   a measuring apparatus configured to measure the object;
   at least one sensor configured to detect sensing information relating to the environment; and
   a controller operatively coupled with the at least one sensor, the controller configured to control the coordinate measuring machine to perform, based on the sensing information, the size tolerance of the object and the precision of the coordinate measuring machine, a specified action.

14. The coordinate measuring machine as defined by claim 13 wherein the controller is configured to control the coordinate measuring machine to measure the object a second time.

15. The coordinate measuring machine as defined by claim 13 wherein the at least one sensor includes a light sensor configured to measure the quantity of light in the environment.

16. The coordinate measuring machine as defined by claim 13 wherein the specified action is a mechanical action.

17. A method of measuring an object using a coordinate measuring machine, the coordinate measuring machine being in an environment, and wherein the object has a size tolerance and the coordinate measuring machine has a precision, the method comprising:

provided a coordinate measuring machine comprising:

at least one sensor configured to detect sensing information relating to the environment; and a controller operatively coupled with the at least one sensor, the controller configured to control the coordinate measuring machine to perform, based on the sensing information, the size tolerance of the object and the precision of the coordinate measuring machine, a specified action;

measuring the object using the coordinate measuring machine to produce measured data;

receiving, at least one sensor, sensing information relating to the environment;

selectively producing an alarm as a function of the sensing information and the measured data; and producing, using the controller, and as a function of at least one of the size tolerance and the precision, an action in response to the alarm when the alarm is produced.

18. The method as defined by claim 17 wherein the sensing information relates to light in the environment.

19. The method as defined by claim 18 wherein the information relating to light in the environment comprises information indicating the spectrum of light in the environment.

20. The method as defined by claim 17 wherein the action is a mechanical action.

\* \* \* \* \*